Patented Sept. 2, 1952

2,609,328

UNITED STATES PATENT OFFICE 2,609,328

SEPARATION OF CELLULAR ORGANISMS FROM AQUEOUS SUSPENSIONS THEREOF

Lionel C. Reed, Mount Vernon, N. Y., assignor to Schwarz Laboratories, Inc., a corporation of New York No Drawing. Application September 3, 1948, Serial No. 47,754

20 Claims. (Cl. 195—57)

The present invention is concerned with the separation of suspended solid matter from aqueous suspensions of organisms such as the residual liquors or beers remaining after the completion of fermentations by yeast, molds and other microorganisms.

As conducive to a clear understanding of the invention, it is noted that where suspended organisms such as for instance yeast or yeast solids are removed by a filter press, by a centrifuge or by sedimentation, the operation is slow for a number of reasons. Among these reasons are (1) the small size of the cells or cell fragments, (2) their small density differential as compared to water, and (3) the fact that yeast cells and especially degraded yeast cells form a slimy compressible filter cake which tends objectionably to impede the seepage of the liquid therethrough.

Slimy, compressible, filter cakes which cause poor filtration rates, necessitate the addition of filter aids such as diatomaceous earth, the use of filtration pressures of 100 to 200 p. s. i. or more, and frequently restrict the conditions of pH and temperature under which a separation is feasible. The use of filter aids is undesirable if the solids recovered are to be used for nutrition whether for food or feed purposes and the conditions of pH and temperature which permit filtration are often not optimum for recovery of the products sought.

Yeast removed from a fermentation or other liquor by centrifugation and filter pressing has a water content of 68 to 73 per cent. To reduce the water content of such yeast materially, drying equipment is required that may be expensive and elaborate, especially if viability, color or dispersibility of the yeast in water is to be preserved.

When food products or animal feeds are prepared from waste brewers yeast, the removal of the bitter hop resins offers serious problems. By the usual method of washing in alkaline solutions to dissolve hop resins, mechanical separation of the solid material becomes extremely difficult. If following the alkaline treatment, the medium is acidified to promote separation of solids, part of the bitter resins re-precipitate and the debittering treatment is incomplete. Re-treatment is then necessary, a wasteful and costly operation.

Among the general objects of the present invention is the rapid and simple separation of organisms such as bacteria, yeasts, and molds, whole, fragmented, or partly degraded from their aqueous suspensions without destroying or materially affecting the utility of either the separated organisms or the liquid portion of the suspension for further processing, use or disposal.

Another object is readily to derive from aqueous suspensions of the above type solids useful for future fermentations where the cells are viable, or solids useful for food products and animal feeds, and in some cases as fertilizer, also as sources for the recovery of vitamins, enzymes, nucleic acids, proteins and protein hydrolyzates.

Another object is readily to separate the solid matter, yeast cells for example, from their aqueous suspensions in form having water content so low as to effect material economy in drying and to afford unusual stability characterized by preservation of normal appearance, and odor for long periods even without refrigeration.

Another object is to provide a viable yeast preparation of good fermentation characteristics and relatively low water content even though not subjected to drying and extraordinary stability even in the absence of refrigeration.

Another object is the ready and convenient debittering of brewer's yeast to make it suitable for food products or animal feeds, without resorting to acid washing of the yeast in order to promote separation of the solids, thus avoiding re-precipitation of bitter hop resins.

Another object is the ready recovery of the liquid portion of the suspension free from suspended material and in form suitable for further processing to derive valuable constituents therefrom.

Another object is to reduce stream pollution and facilitate disposal of the liquid wastes that occur in the fermentation industries especially, and to do this by efficient and rapid removal of suspended solids, yeast and bacterial cells and particles or cell fragments or other noisome or putrescible solids of high biochemical oxygen demand, before discharging the liquid wastes into sewage disposal systems and thence into streams.

According to the invention in its broader aspects, aqueous suspensions of organisms are treated with any boron compound that yields borate ions in aqueous solution with resultant agglomeration or coagulation of the suspended solids into a curd-like, clotty mass which is not sticky and does not adhere to the surrounding surfaces, and therefore admits of ready separation from the aqueous carrier.

Suspensions of particles that may be subjected to the treatment prescribed by the invention may be any of a wide range of yeasts, bacteria, molds, or protein fractions thereof. In an important industrial application of the invention, it is used to promote separation of yeast cells from suspensions that are aqueous or essentially aqueous and that result from industrial fermentation practices. Such yeasts may be the culture yeasts or yeast-like fungi used for the production of ethyl alcohol, glycerol, and other industrial products of yeast fermentation, or grown for the yeast substance itself such as bakers yeast, or primary grown yeast for food or pharmaceutical uses. They may include species of the genera Saccharomyces, Schizosaccharomyces, Brettanomyces, Torulopsis, Monilia, Candida, Rhodotorula, or others used for inoculated or natural fermentation. The usual materials treated according to the present invention are the residual liquors or beers left after completion of fermentation.

Any boron compound that will yield borate ions in solution may be used in applying the invention to suspensions or slurries such as those set forth. Among the soluble boron compounds applicable are hydrogen borate, or boric acid, $H_3BO_3$, the alkali borates including ammonium borate $NH_4HB_4O_7.3H_2O$, lithium borate $Li_2B_4O_7.5H_2O$, borax or sodium borate $Na_2B_4O_7.10H_2O$, and potassium borate $$K_2B_4O_7.5H_2O$$

borates of the alkaline earth metals including calcium, magnesium and strontium, the soluble metal borates, particularly copper borate and zinc borate, as well as complex boron acids such as boro-tungstic and boro-salicylic acid.

The coagulation may be effected at any temperature above the freezing point and below the boiling point of water and at pH of 6.0 to 10.5. In general the lower the temperature employed, preferably below 60° C., and the nearer the pH is to the optimum range of 7.5 to 9, the better and more useful the coagulation.

When the slurry is acid, it is brought to the desired pH range by the addition of alkaline materials, such as aqua ammonia or ammonium hydroxide, the oxides or hydroxides of the alkali and alkaline earth metals or those salts of the alkali metals which have an alkaline reaction, such as the phosphates, carbonates, borates and silicates.

Where the borate is itself alkaline such as for instance borax, it may, if used in sufficient quantity, serve the dual function of bringing the slurry into the desired pH range, and of effecting the coagulation as well.

The concentration of yeast dry solids in the slurry to be treated according to the present process may be anywhere from 0.5 per cent to the limit of fluidity which may lie between 20 and 30 per cent of yeast dry solids by weight. Preferably the range of yeast content of the slurry to be treated is between 7.5 and 70 per cent.

Although as little as 0.01 per cent of borax has some beneficial effect on the separation of solids in a slurry of the type described above (i. e., 0.1 gram of borax per liter of slurry), 0.03 per cent $Na_2B_4O_7.10H_2O$ weight by volume (i. e., 0.3 gram borax or .034 gram of elemental boron as borate per liter of slurry) or other soluble boron compound yielding borate containing the same amount of elemental boron per liter of slurry was found to be the minimum proportion for practical utilization. Where as little as .03 per cent of $Na_2B_4O_7.10H_2O$ is used, the effective coagulation occurs in the temperature range between 0° and 60° C. and the pH range 7.5 to 9 and the concentration range of 7.5 to 20 per cent. In general, increasing the concentration of sodium borate up to 3 gm. per liter or even more or its equivalent in boron of other boron compound tends to extend the range of concentration, pH, and temperature in which coagulation will occur. The maximum proportion of borate is governed by economy and the solubility of the compound as well as the nature of the end products desired, inasmuch as an excess over the recommended amounts does not reverse the coagulatory effect. Proportions of coagulant in the higher range might be desirable for the preparation of fertilizer, for instance.

Within the range of conditions mentioned above, coagulation usually takes the form of a curd-like, clotted mass, free of stickiness, which does not adhere to surrounding surfaces. Operations below the optimum range of either pH or concentration or above the optimum range of either pH or temperature result in a granular slurry and as the divergence from the optimum range increases, the slurry becomes progressively more homogeneous, but even when the slurry appears to be quite homogeneous by unaided visual observation, improved separation and elimination of the usual sticky or gummy properties of yeast substances is still obtainable by virtue of partial agglomeration which may easily be followed by microscopic examination.

The solids coagulated in the manner indicated are readily removed from the aqueous liquor in any convenient manner, by drainage of the liquid therefrom, for example, and the clotted, coagulated mass is then dewatered, desirably by squeezing in a hydraulic press or between rollers. After thus expressing excess water, the final water content of the residue is well below that of yeast product separated from the untreated slurry by sedimentation, centrifugation, and filtration, a decided industrial advantage. Yeast products derived from untreated slurry have a water content of 68 to 73 per cent, and therefore require the removal by evaporation of more than two pounds of water per pound of resultant stable dry product. The present process on the other hand yields a product of intact yeast cells with 60 to 65 per cent water content or of plasmolyzed yeast with as little as 45 to 55 per cent water content, low enough in many cases to dispense with drying and possible degeneration resulting from the application of heat and vacuum. When drying is required, an economy is effected of 20 to 60 per cent in the steam needed for water evaporation. An added advantage in preparing dried viable yeast results from the coagulation process, because the moist cake is much more porous and friable than the usual pressed yeast cake commonly used to prepare dry viable yeasts, permitting the use of a shorter dehydration period or lower drying temperature, or both and thereby producing a dry viable yeast relatively free from the degenerative effects of heat, as for example, case hardening, and partial autolysis.

Separation of yeast cells or yeast solids from the liquids accompanying them is industrially useful and necessary in a wide variety of important applications. These include, for example, utilization of the solids for foods, feeds, and chemical or pharmaceutical purposes, utilization of the liquor separated from the solids for its valuable components such as vitamins, yeast extracts, protein hydrolyzates, fine biochemical compounds and the like, or for the avoidance or reduction of waste disposal hazards by removing a substantial portion of the organic matter of the wastes before discharging the liquid residue into a public stream or sewage disposal system.

The coagulated clotted mass of organic material removed from the slurry according to the procedure of the present invention retains some of the borate. Even a considerable proportion of borate is unobjectionable for some purpose.

An important use of the yeast solids separated according to the present invention is for animal feed or food product. When the boron content is kept low by the use of as little as 0.3 gram of borax per liter to coagulate the slurry, or when excess borate is washed out of the solid cake after separation from its mother liquor, the product is useful as such food product or animal feed since it has high available protein content and its boron content will not be excessive, being well below 500 parts of metallic boron per million parts of feed and desirably containing only between 50 and 300 parts and preferably between 50 and 200 parts of metallic boron per million parts of feed.

In preparing such animal feed or food product, the alkaline range used in the coagulation step should be preferably pH 7.5 to 8.5 inasmuch as this range avoids the bitter hop resins so difficult to remove from brewer's yeast, and the product is accordingly palatable. By reason of the coagulation produced by the mildly alkaline borate treatment, there is no difficulty in separating the solids from the beer and solubilized impurities, no acid addition is needed in order to promote separation, and the consequent reprecipitation of bitter hop resins is wholly avoided.

Where it is essential or desirable to obtain a solid product in which the boron content is below the small amount retained by it in the coagulation treatment above described, part of the boron compound used for this purpose may be replaced by a soluble silicate, such as commercial water-glass (a sodium silicate); if the latter is used jointly with salt such as magnesium sulfate, ammonium carbonate or the like that forms highly hydrated gels with silicates.

The extent to which boron compound may be replaced by silicates depends upon the organism or its modification being treated, the minimum degree of agglomeration that can be tolerated for the particular process in which the material treated is a factor, economic considerations arising by reason of the increased weight of silicate and the additional requirement of a gel forming salt required as compared to the borax or other boron compound used, and the nature of the end product for which the process is being worked. If for each gram atom of boron there is substituted from 3 to 10 gram atoms of silicon, the desired coagulation is accomplished as satisfactorily as if only boron compound were used as the coagulant. While complete substitution of silicon for boron improves filtration slightly as compared to filtration of the untreated slurry, the necessary characteristic coagulation to render possible the desired ready segregation of solids is however not attained unless a small amount of boron is also present. A borate should therefore be present in amount to contain preferably at least one-third to one-half the number of gram atoms of the silicon present in the coagulant. While both borate and silicate are thus used in conjunction as a coagulant, that coagulant would be present preferably in amount between 2 and 30 grams per liter of slurry where borax and water glass together are employed as the components of the coagulant.

In an illustrative example of such substitution, one liter of yeast slurry is mixed with 27.6 grams of water glass and sufficient magnesium sulfate for gel formation. The addition of as little as one-half gram of borax to a liter of the silicate slurry produces good coagulation of the yeast solids suitable for mechanical separation, although a larger amount of borax up to two grams or more could be added.

Another important use for the solid products separated by the foregoing treatment is as a pressed yeast of high degree of viability and vigorous fermentive power. The boron compound, when contained in viable yeast, has surprising utility in that it acts as a stimulant for fermentation when the yeast is re-suspended preparatory to fermentation action. Yet the yeast is remarkably stable and, when stored in a closed vessel even without refrigeration, remains unspoiled for extraordinarily long periods of time.

Still another use for the solid products separated by the foregoing treatment is as intermediates for the preparation of vitamins, enzymes, nucleic acids, proteins and the like, with or without utilization of the residuum as a by-product.

The invention has an additional important use for solving the difficulties of disposal of waste brewer's yeast and analogous residual beers from various fermentation industries, the high biochemical oxygen demand of which organic suspensions are inimical to wild life when the waste is discharged into public streams, and imposes an excessive load on the oxidizing powers of sewage disposal plants. By the present processes the organic material is expeditiously separated from the residual beers at a cost so low that the process is economically feasible, even if the solid material thus separated were not otherwise industrially used and only the liquid residue were discharged into the public stream or sewage disposal system.

While the foregoing description is believed to be adequate to teach those skilled in the art how to practice the invention, a number of specific illustrative examples follows to assure full compliance with statutory requirements:

*Example 1*

To one liter of waste brewer's yeast as washed from the fermenters and containing about 10 per cent of solid organic material, there is added 20 ml. of coagulant containing 40 gr. of borax ($Na_2B_4O_7.10H_2O$) per liter, and there is also added a 10 per cent slurry of slaked lime until the mixture has pH 8. At ambient temperature, the yeast promptly coagulates into a curd-like mass which may be passed on a canvas belt through a pair of dehydrating rolls. The yeast solids thus separated may be used moist as feed or fertilizer or may be dried if desired.

The expressed liquid may be discharged into a sewage disposal system with material reduction in the biochemical oxygen demand up to as much as 50 per cent.

*Example 2*

To one liter of liquid brewer's yeast containing up to 10 per cent dry yeast solids, there is added 50 ml. of coagulant containing 40 grams of $K_2B_4O_7.5H_2O$ per liter, and 10 per cent solution of sodium hydroxide until the pH of the slurry, maintained at 10° C., is 8.5. The yeast promptly coagulates as a curd-like mass. The slurry is poured into muslin bags and subjected to hydraulic pressure, leaving 250 grams of solid yeast cake of friable, non-sticky, and extremely stable character, containing approximately 60 per cent of water, and 50 to 300 parts per million of boron. The cake may be used in various ways of which two examples follow:

(a) The cake may be stored in clean closed containers at 10° C. Its stability is so high that after ten weeks it is still fresh in odor and appearance and ferments rapidly in a hopped sterile wort. Filter cake from untreated liquid yeast on the other hand, contains 71.5 per cent water and spoils after only 10 days at 10° C.

(b) The cake may be placed in a dry oven at 37° C. until the water content has been reduced to 15 per cent or less. When kept in a clean closed container at room temperature (22° C.), the dry yeast will ferment vigorously in a sterile hopped wort even after ten weeks' storage.

Example 3

To one liter of liquid brewer's yeast containing 15 per cent of organic solids, there is added 2 liters of tap water at 5° C., and three grams of powdered sodium carbonate. The pH of the slurry is then raised to 10.5 with a 50 per cent sodium hydroxide solution, whereby most of the bitter principle of the hops is solubilized. Holding the slurry for 15 to 30 minutes at the pH and temperature stated above is desirable. At the end of this period 15 cc. of a 40 per cent sodium silicate solution and 1 gram magnesium sulfate U. S. P. are added followed twenty minutes later by 1 gram of potassium borate

$(K_2B_4O_7.5H_2O)$

The pH is finally adjusted with a 10 per cent solution of hydrochloric acid to pH 8.5, at which no precipitation of the solubilized bitter principle occurs, after which the slurry, containing the yeast solids now in a coagulated form, is run into a centrifuge with perforated basket where the solids are easily recovered. The cake is washed with half a liter of .5 per cent sodium carbonate solution followed by half a liter of water at 5° C. sufficient to end with a nearly colorless filtrate.

The washed cake of about 65 to 70 per cent water content may be dried further in an oven. It is quite free of bitterness and can serve as an excellent animal feed.

Example 4

To one liter of 3 per cent dry solid suspension of a strain of *Torula utilis* is added 100 cc. of 10 per cent solution of boro-salicylic acid and a 10 per cent solution of sodium carbonate is then added until the pH reaches 8.2. The yeast thereupon coagulates into a curd-like mass. The mass is filtered on a Buchner funnel and washed with one-fourth liter of tap water to yield about 90 grams of yeast cake having a water content of 65 to 70 per cent.

Example 5

One thousand liters of baker's yeast slurry containing 15 per cent of dry yeast solids is hydrolyzed with 3 per cent sodium hydroxide at a temperature of 30° C. for two hours. Three kg. of dry calcium borate is then added under vigorous agitation. Then there is added a 28 per cent solution of hydrochloric acid to bring the pH to 8.5. The yeast now coagulates partially. It is filtered rapidly through a plate and frame filter press in the absence of any filter aid at a maximum pressure of 80 pounds per square inch.

The clear filtrate may serve as a source of ribonucleates.

The residual cake has a water content of 55 to 65 per cent, a protein content (N×6.25) of 40 to 50 per cent and 250 parts per million of boron, and thus constitutes an excellent animal feed.

As many changes could be made in the above process and product, and many apparently widely different embodiments of this invention could be made without departing from the scope of the claims, it is intended that all matter contained in the above description shall be interpreted as illustrative and not in a limiting sense.

Having thus described my invention what I claim as new and desire to secure by Letters Patent of the United States is:

1. The process of facilitating the separation of suspended organic matter from an aqueous slurry of organisms by coagulation of said solids by the addition of boron compound that yields borate ions in aqueous solution at pH 6.0 to 10.5.

2. The process of facilitating the separation of suspended organic matter from an aqueous slurry of yeast products in suspension therein by coagulation of said suspended matter by the addition of a boron compound that yields borate ions in aqueous solution at pH 6.0 to 10.5.

3. The process of separating yeast products from an aqueous slurry in which the same are suspended by the addition to the slurry of a water soluble borate at pH 6.0 to 10.5 and at temperature between the freezing point and the boiling point of water with consequent coagulation of the yeast suspension.

4. The process of separating yeast products from an aqueous slurry in which the same are suspended by the addition to the slurry of a water soluble borate at pH 7.5 to 9 and at temperature between 0° C. to 60° C. with consequent coagulation of the yeast suspension.

5. The process of separating yeast products from an aqueous slurry in which the same are suspended by the addition to the slurry of a water soluble borate at pH 6.0 to 10.5 and at temperature between the freezing point and the boiling point of water, with consequent agglomeration of the yeast suspension in a clotted coagulated mass, and after separating said matter, thereupon subjecting the same to high mechanical pressure for expulsion of water therefrom with the resultant product of water content well below 68 per cent.

6. The combination recited in claim 5 in which the desired pH range is attained by the addition of alkaline substance selected from the hydroxide of ammonium, from the oxides and hydroxides of the alkali metals, and of the alkaline earth metals and from the phosphates, carbonates, borates, and silicates of ammonium and the alkali metals.

7. The combination recited in claim 5 in which the soluble borate is selected from the hydrogen, ammonium, alkali, alkaline earth, copper and zinc borates, and from boro-tungstic and boro-salicylic acids.

8. The process of separating suspended organic matter from an aqueous slurry of organisms by adding to the slurry not less than 0.1 gram of water soluble borate per liter of said slurry at pH 6.0 to 10.5 and at temperature between the freezing point and the boiling point of water.

9. The process of separating yeast products in suspension in an aqueous slurry of concentration of 0.5 per cent to the limit of fluidity of such yeast, by the addition to the slurry of water soluble borate in proportion of 0.1 to 3 grams per liter of slurry at pH 7.5 to 9 and temperature of 0 to 60° C., with resultant prompt coagulation of the yeast product in a curd-like clotted mass of non-sticky character, removing said mass from the carrying liquid and expressing excess water therefrom.

10. The process recited in claim 9, in which the concentration of the yeast solids in the slurry being treated is from 7.5 to 20 per cent.

11. The process of readily recovering the suspended matter from an aqueous slurry of organisms, which comprises the coagulation of said suspended matter by the addition to the slurry of .3 to 3 grams per liter of soluble borate at pH 6.0 to 10.5 and at temperature between the freezing and the boiling point of water, expressing excess water from the withdrawn clotted, curd-like mass with resultant product of water content less than 60 per cent and metallic boron content of not more than 500 parts per million.

12. The process recited in claim 11 wherein up to two thirds of the borate is replaced with approximately three times its weight of silicate with the resultant reduction of residual boron content to not more than 200 parts per million.

13. The process of recovering debitterized yeast from residual beers, which comprises treating the beer slurry with the yeast and hop products therein with water soluble borate of concentration of about .3 gram per liter, adding alkali to the slurry to maintain it in the alkaline range at a temperature between the freezing point and the boiling point of water with resultant coagulation of the suspended matter into a non-sticky, curd-like, matted mass, without objectionable precipitation of hop resins, withdrawing the coagulated mass from the residual liquor, and expressing excess water therefrom.

14. The process of separating debitterized yeast from residual beers as claimed in claim 13, in which the suspended matter in the original slurry is from 7.5 to 20 per cent of the mass, in which the pH is adjusted by the addition of aqua ammonia to pH 7.5 to 9 and in which the process is conducted at substantially room temperature.

15. The process of treating organic waste that comprises a slurry of an aqueous suspension of organisms, which comprises adding water soluble borate to the slurry under conditions that yield borate ions in aqueous solution at pH 6.0 to 10.5, with resultant prompt coagulation of the suspension, separating the coagulated material, and discharging only the liquid residue into the public stream or sewage disposal system, with consequent relief from the high biochemical oxygen demand of the organisms removed.

16. The process of waste disposal in the fermentation industries in which the residual or waste beer after complete fermentation comprises a suspension of yeast cells and fragments thereof in an aqueous medium, which consists in removing the suspended matter from the waste slurry by first coagulating the same, by the addition thereto of a water soluble borate while maintaining the slurry at pH 6.0 to 10.5, separating the coagulated solids and introducing only the residual liquid into the sewage disposal system with consequent relief of the load thereon due to the high biochemical demand of the yeast thus removed.

17. The process of preparing a food product from waste brewer's yeast slurry derived from fermentation, which comprises alkalizing the waste slurry to pH 7 to 9.5, adding water soluble boron compound in amount sufficient to yield borate containing .034 gram of elemental boron per liter of slurry, thereby causing the solids to coagulate in a matted, curd-like mass, while maintaining the hop resins in solution, removing the curd-like mass and expressing excess water therefrom with a resultant product of high nutritive content and boron content of 50 to 300 parts per million.

18. As a composition of matter, a stable pressed viable yeast, which has a water content of less than 68 per cent and is free from the degeneration resulting from high heat or vacuum, containing 50 to 500 parts per million of boron and characterized by superior keeping qualities and rapid fermenting action.

19. As a composition of matter, a stable, dried viable yeast which has a water content of less than 15 per cent and is free from the degeneration resulting from prolonged heat, containing 50 to 200 parts per million of boron and characterized by superior keeping quality and rapid fermenting action.

20. The process of readily recovering the suspended matter from an aqueous slurry of organisms, which comprises the coagulation of said suspended matter by the addition to the slurry at pH 6.0 to 10.5 of coagulant comprising soluble borate and soluble silicate in amount between 2 and 30 grams per liter where borax and water glass respectively are used, and the gram atoms of boron present are from ⅓ to ½ the gram atoms of silicon.

LIONEL C. REED.

REFERENCES CITED

The following references are of record in the file of this patent:

UNITED STATES PATENTS

| Number | Name | Date |
|---|---|---|
| 820,864 | Roehr | May 15, 1906 |
| 907,910 | Stein | Dec. 29, 1908 |
| 2,235,614 | Gulck | Mar. 18, 1941 |